United States Patent
Fechner et al.

(10) Patent No.: US 8,283,269 B2
(45) Date of Patent: Oct. 9, 2012

(54) SOLARIZATION-RESISTANT GLASS COMPOSITION HAVING A UV-CUTOFF WITH A DEFINITE TRANSMITTANCE GRADIENT AND RADIATING DEVICE FOR A WEATHERING APPARATUS CONTAINING A GLASS OF SAID COMPOSITION

(75) Inventors: Joerg Hinrich Fechner, Weiden (DE); Franz Ott, Konnersreuth (DE)

(73) Assignee: Schott AG, Mainz (DE)

( * ) Notice: Subject to any disclaimer, the term of this patent is extended or adjusted under 35 U.S.C. 154(b) by 377 days.

(21) Appl. No.: 12/578,863

(22) Filed: Oct. 14, 2009

(65) Prior Publication Data

US 2010/0108914 A1    May 6, 2010

(30) Foreign Application Priority Data

Oct. 30, 2008  (DE) .......................... 10 2008 043 317

(51) Int. Cl.
- C03C 3/091 (2006.01)
- C03C 3/093 (2006.01)
- H01J 17/16 (2006.01)
- H01J 7/26 (2006.01)

(52) U.S. Cl. .............. 501/66; 501/67; 313/636; 313/22; 313/24; 313/26

(58) Field of Classification Search .................... 501/66, 501/67; 313/22, 24, 26, 636
See application file for complete search history.

(56) References Cited

U.S. PATENT DOCUMENTS

| | | | |
|---|---|---|---|
| 4,222,781 A * | 9/1980 | Morse et al. ..................... 501/13 |
| 4,565,791 A | 1/1986 | Boudot et al. |
| 5,064,461 A | 11/1991 | Morena et al. |
| 5,219,801 A | 6/1993 | Shorrock et al. |
| 5,447,891 A | 9/1995 | Spinosa et al. |
| 5,459,110 A | 10/1995 | Brix |
| 5,610,108 A | 3/1997 | Watzke et al. |
| 5,612,262 A | 3/1997 | Kloss et al. |
| 5,747,395 A * | 5/1998 | Smith et al. .................. 501/5 |
| 5,747,399 A | 5/1998 | Kosokabe et al. |
| 6,204,212 B1 | 3/2001 | Kunert et al. |
| 6,417,124 B1 * | 7/2002 | Peuchert et al. ................ 501/66 |
| 6,635,592 B1 | 10/2003 | Kosokabe et al. |
| 6,851,280 B2 | 2/2005 | Ott et al. |
| 7,375,043 B2 | 5/2008 | Fechner et al. |
| 7,491,668 B2 | 2/2009 | Fechner et al. |
| 7,951,312 B2 * | 5/2011 | Ott et al. ....................... 252/588 |
| 8,004,196 B2 * | 8/2011 | Fechner et al. ............... 313/636 |
| 2001/0055930 A1 | 12/2001 | Ott et al. |
| 2003/0087745 A1 | 5/2003 | Peuchert et al. |
| 2003/0184211 A1 | 10/2003 | Hueber et al. |
| 2003/0232169 A1 | 12/2003 | Kawai |
| 2004/0176237 A1 | 9/2004 | Ott et al. |
| 2004/0239253 A1 | 12/2004 | Walser et al. |
| 2004/0266603 A1 | 12/2004 | Fechner et al. |
| 2005/0037911 A1 | 2/2005 | Fechner et al. |
| 2005/0151116 A1 * | 7/2005 | Fechner et al. ............. 252/186.1 |
| 2006/0006786 A1 | 1/2006 | Fechner et al. |
| 2006/0009343 A1 | 1/2006 | Fechner et al. |
| 2006/0010917 A1 | 1/2006 | Fechner et al. |
| 2006/0120105 A1 | 6/2006 | Fechner et al. |
| 2006/0205583 A1 | 9/2006 | Naumann et al. |
| 2006/0264313 A1 | 11/2006 | Fechner et al. |
| 2008/0254301 A1 | 10/2008 | Fechner et al. |
| 2008/0259602 A1 | 10/2008 | Fechner et al. |
| 2009/0109654 A1 * | 4/2009 | Fechner et al. .............. 362/97.1 |
| 2009/0141478 A1 * | 6/2009 | Niguma et al. .............. 362/97.1 |
| 2010/0045164 A1 | 2/2010 | Fechner et al. |
| 2010/0108914 A1 | 5/2010 | Fechner et al. |

FOREIGN PATENT DOCUMENTS

| | | |
|---|---|---|
| DE | 198 42 942 | 4/2000 |
| DE | 100 25 465 | 8/2002 |
| DE | 10 2004 027 119 | 12/2004 |
| DE | 10 2004 027 120 | 12/2004 |
| JP | 8-12369 | 1/1996 |
| JP | 2002-293571 | 10/2002 |
| SU | 724465 A * | 3/1980 |
| WO | WO 2006072449 A2 * | 7/2006 |
| WO | WO 2006087675 A2 * | 8/2006 |
| WO | WO 2006106660 A1 * | 10/2006 |
| WO | WO 2007131722 A2 * | 11/2007 |

OTHER PUBLICATIONS

Technology of Glass, Edited by Northwest Institute of Light Industry, Published by China Light Industry Press, Jan. 1982, p. 504 (With Certified English Translation).

* cited by examiner

Primary Examiner — Karl Group
Assistant Examiner — Elizabeth A Bolden
(74) Attorney, Agent, or Firm — Michael J. Striker

(57) ABSTRACT

The borosilicate glass with improved solarization-resistance has a transmittance curve within an area bounded by respective curves defined by the corresponding equations $\tau=1.7\cdot(\lambda-277)$ and $\tau=1.6\cdot(\lambda-284)$ in a wavelength range of 283 nm to 325 nm. This glass has a composition, in wt. % based on oxide content, of: 55-82, $SiO_2$; 10-20, $B_2O_3$; 1-10, $Al_2O_3$; 0-5, $Li_2O$; 0-10, $Na_2O$; 0-10, $K_2O$; 0-10, $\Sigma M_2O$; 0-5, $MgO$; 0-10, $CaO$; 0-5, $SrO$; 0-15, $BaO$; 0-15, $\Sigma MO$; 0-3, $ZrO_2$; 0-5, $ZnO$; 0-2, $CeO_2$; 0-3, $WO_3$; 0-2, $SnO_2$; 0-0.1, $Fe_2O_3$; 0.05-2, $MoO_3$; 0-5, $Bi_2O_3$; 0-1, $TiO_2$ and 0-5, oxides of selected rare earth and Group IVB to VIIIB elements. The transmittance is adjusted by varying the $MoO_3$ content and if necessary the $TiO_2$ and $Bi_2O_3$ content. The glass is especially suitable for use in a weathering apparatus.

8 Claims, 3 Drawing Sheets

SOLARIZATION-RESISTANT GLASS COMPOSITION HAVING A UV-CUTOFF WITH A DEFINITE TRANSMITTANCE GRADIENT AND RADIATING DEVICE FOR A WEATHERING APPARATUS CONTAINING A GLASS OF SAID COMPOSITION

CROSS-REFERENCE

The invention described and claimed herein below is also described in German Patent Application DE 10 2008 043 317.9, filed Oct. 30, 2008 in Germany. The aforesaid German Patent Application provides the basis for a claim of priority of invention for the invention described herein below under 35 U.S.C. 119 (a)-(d).

BACKGROUND OF THE INVENTION

1. The Field of the Invention

The subject matter of the invention includes a solarization-resistant glass composition having a UV-cutoff with a predetermined transmittance gradient and a radiating device for a weathering apparatus containing a glass with the aforesaid glass composition.

2. The Description of the Related Art

Man-made weathering apparatus simulates intense solar radiation and if necessary additional climatic conditions, such as high temperatures, high or low humidity, corrosive atmospheres (ocean climate) and so forth.

A weathering apparatus is used to perform tests, especially to determine the resistance of lacquers, polymers, pigments, paints, light stabilizers, plastics and the like to aging, in order to ascertain their service life during exposure to UV and visible radiation.

The radiating device in the weathering apparatus, which should simulate solar radiation, comprises a lamp with a radiation source or light source that produces radiation or light, e.g. a metal vapor lamp or a high-power Xenon lamp. These lamps can have a respective power of up to 60 kW without more.

The radiation source is arranged within an inner glass tube in the radiating device. An additional tube, the outer tube, is arranged surrounding the inner glass tube and spaced from it. A cooling fluid, usually water, flows continuously through the hollow chamber between the inner and the outer tubes for cooling the apparatus in order to maintain a constant temperature in the weathering apparatus.

The inner glass tube and/or the outer glass tube should have a UV-cutoff in a wavelength range of about 280 nm to about 330 nm, which has a predetermined transmittance gradient. The term "transmittance gradient" means the slope of the dependence of the transmission on wavelength.

According to the state of the art frequently glass is used in which a classic UV blocking by means of $TiO_2$ or $CeO_2$ takes place. Generally the transmittance gradient of the UV-cutoff is too steep in the case of this sort of classical UV blocking (using $TiO_2$) and/or the glass has a tendency toward solarization, which is too great (using $CeO_2$). It is also possible to influence the UV-cutoff by doping the glass with $Fe_2O_3$. A carbon arc lamp for a weathering apparatus is known e.g. from JP 03-218940, which comprises a glass doped with $Fe_2O_3$, $TiO_2$ and $Sb_2O_3$. This glass contains 5 to 80 ppm of $Fe_2O_3$, 50 to 1000 ppm of $TiO_2$ and 0.02 to 1% of $Sb_2O_3$ in a borosilicate glass with a composition comprising 65-80%, $SiO_2$; 1-10%, $Al_2O_3$; 4-12%, $\Sigma Li_2O+Na_2O+K_2O$; 8-20%, $B_2O_3$ and 0-10%, $\Sigma CaO+MgO+BeO+ZnO$.

The total transmission of a $Fe_2O_3$-containing glass is generally reduced as the glass ages under intense solarization, i.e. by action of UV light. That is disadvantageous because the radiating device or the weathering apparatus ages so that uniform irradiation of the test samples is not guaranteed. For that reason the meaningfulness and the reproducibility of the test results obtained with that sort of weathering apparatus are not guaranteed.

SUMMARY OF THE INVENTION

It is an object of the present invention to provide a glass with a greater solarization stability and with a defined transmittance gradient, which has a transmittance curve that is within an area bounded by or a corridor defined by the respective equations $\tau=1.7\cdot(\lambda-277)$ and $\tau=1.6\cdot(\lambda-284)$ in a wavelength range of from 283 nm to 325 nm, wherein $\tau$ is the transmittance in percent and $\lambda$ is the wavelength in nm.

It is an additional object of the present invention to provide a radiating device for a weathering apparatus comprising the aforesaid glass.

These objects and others, which will be made more apparent hereinafter, are attained by a glass with the composition defined in the claims appended herein below and by the radiating device described in the appended claims.

According to the invention the solarization-resistant glass having a UV-cutoff with a definite transmittance gradient has a composition, in percent by weight on the basis of oxide content, comprising:

| | |
|---|---|
| $SiO_2$ | 55-82 |
| $B_2O_3$ | 10-20 |
| $Al_2O_3$ | 1-10 |
| $Li_2O$ | 0-5 |
| $Na_2O$ | 0-10 |
| $K_2O$ | 0-10 |
| $\Sigma$ alkali oxides ($M_2O$) | 0-10 |
| MgO | 0-5 |
| CaO | 0-10 |
| SrO | 0-5 |
| BaO | 0-15 |
| $\Sigma$ alkaline earth oxides (MO) | 0-15 |
| $ZrO_2$ | 0-3 |
| ZnO | 0-5 |
| $CeO_2$ | 0-2 |
| $WO_3$ | 0-3 |
| $SnO_2$ | 0-2 |
| $Fe_2O_3$ as impurity | 0-0.1 |
| $MoO_3$ | 0.05-2 |
| $Bi_2O_3$ | 0-5 |
| $TiO_2$ | 0-1 |
| Oxides of Rh, Hf, Ta, Re, Os, Ir, Pt, La, Pr, Nd, Sm, Eu, Gd, Tb, Dy, Ho, Er, Tm, Yb, Lu | 0-5. |

The transmittance of this borosilicate glass in the UV region between 283 nm and 330 nm is adjusted by varying the amount of $MoO_3$ in the glass. $TiO_2$ and $Bi_2O_3$ can still be used to assist the action of the $MoO_3$ and reduce the solarization.

In order to attain a desired transmission curve in the corridor formed by or the area bounded by respective curves defined by the corresponding equations $\tau=1.7\cdot(\lambda-277)$ and $\tau=1.6\cdot(\lambda-284)$ in a wavelength range of from 283 nm to 325 nm with a glass layer thickness of 1.3 mm, 0 to 0.5 wt. % of $TiO_2$, 0.1 to 0.5 wt. % of $MoO_3$ and 0 to 0.2 wt. % of $Bi_2O_3$ are added to the glass. However addition of 0.1 to 0.2 wt. % of $TiO_2$ or $Bi_2O_3$ and 0.15 to 0.2 wt. % $MoO_3$ is preferred for a glass of this thickness. When a glass of a different layer thickness is employed the amounts of the oxides that determine the UV transmission, namely $MoO_3$, $TiO_2$ and $Bi_2O_3$, are adjusted accordingly in order to obtain the desired transmission. It is preferred to adjust the UV-cutoff and its transmittance gradient only by adjusting the amounts of $MoO_2$ in a range of 0.05 to 0.5, especially 0.15 to 0.25, and most preferably 0.2 to 0.22 wt. %.

Preferred embodiments of the glass according to the invention contain, in weight percent on the basis of oxide content:

| | |
|---|---|
| $SiO_2$ | 60-79 |
| $B_2O_3$ | 15-20 |
| $Al_2O_3$ | 1-4 |
| $Li_2O$ | 0-2 |
| $Na_2O$ | 0-5 |
| $K_2O$ | 0-7 |
| Σ alkali oxides | 0-10 |
| MgO | 0-2 |
| CaO | 0-2 |
| SrO | 0-1 |
| BaO | 0-4 |
| Σ alkaline earth oxides | 0-5 |
| $ZrO_2$ | 0-3 |
| $CeO_2$ | 0-1 |
| $Fe_2O_3$ | 0-0.05 |
| $WO_3$ | 0-1 |
| $SnO_2$ | 0-2 |
| $MoO_3$ | 0.05-1 |
| $Bi_2O_3$ | 0-1 |
| $TiO_2$ | 0-0.5. |

On account of the undesirable solarization effect the glasses according to the invention should contain as little $Fe_2O_3$ and/or $CeO_2$ as possible, i.e. under 1 wt. % respectively. The glass should be as free of $Fe_2O_3$ as possible because of the solarization tendency, which generally can be tolerated when $Fe_2O_3$ is present as an unavoidable impurity in amounts of up to 500 ppm (by weight).

BRIEF DESCRIPTION OF THE DRAWINGS

The objects, features and advantages of the invention will now be illustrated in more detail with the aid of the following description of the preferred embodiments, with reference to the accompanying figures in which.

DESCRIPTION OF THE PREFERRED EMBODIMENTS

1. Examples of Glass Compositions and their Transmission Properties

Examples of the glass compositions according to the invention and comparative compositions are provided in the following Table I. Examples A1 to A7 are compositions according to the present invention and examples V1 to V4 are comparative compositions, which are not of the present invention. The amounts of the ingredients in the compositions are given in percent by weight on the basis of oxide content in the table.

Figure 1:
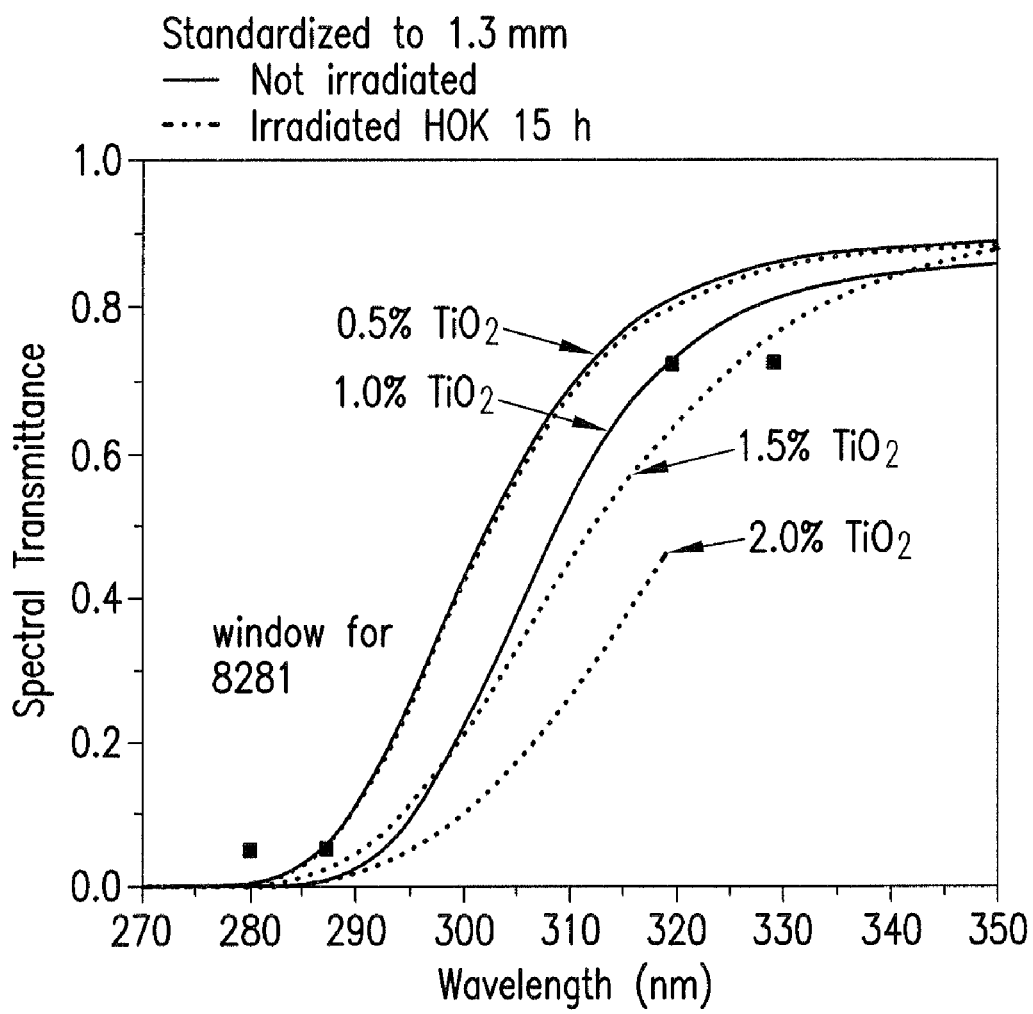
FIG. 1 is a graphical illustration of the dependencies of the transmittances of comparative glass compositions V1 to V4 that are not of the present invention on wavelength in the ultraviolet range of the spectrum.
Figure 2:
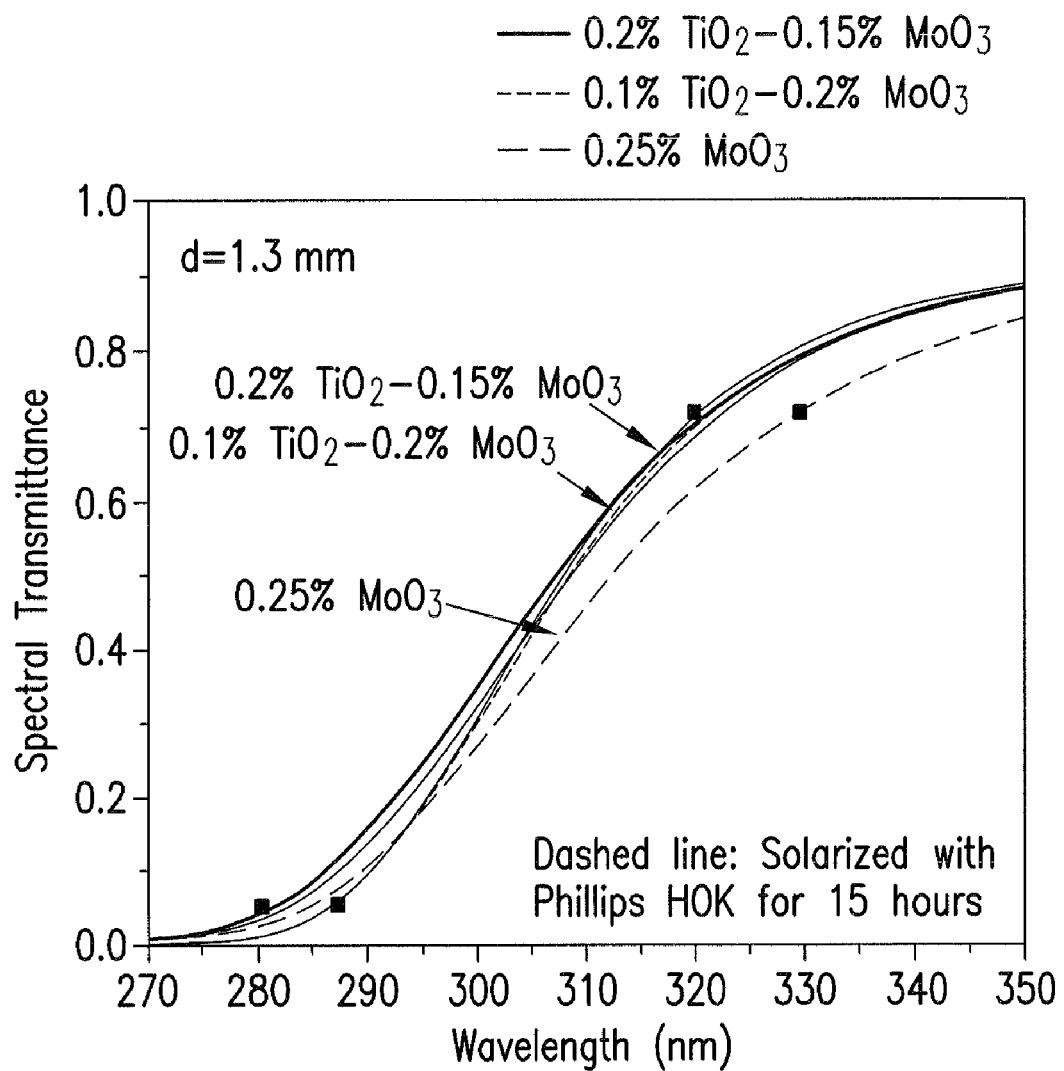
FIG. 2 is a graphical illustration of the dependencies of the transmittances of glass compositions A3, A5 and A7 according to the present invention on wavelength in the ultraviolet range of the spectrum.

The spectral transmittances of examples A3, A5 and A7 according to the invention are shown in FIG. 2. The spectral transmittances of the comparative examples V1 to V4 are shown in FIG. 1. The transmittance values in the figures are absolute values, i.e. a transmittance of 1.0 corresponds to 100-percent transmission. The transmittance was measured for a 1.3 mm thick sample of the glass in the case of FIG. 2, but was normalized to a sample of 1.3 mm thickness in the case of FIG. 1.

The transmittance curves shown in the figures with solid lines are for unirradiated samples of both the glass of the invention and the comparative glass. The transmittance curves shown with dashed lines are for samples of the glass with the same thickness, 1.3 mm, which have been irradiated for 15 hours with radiation from a Phillips HOK lamp, i.e. solarized for 15 hours.

TABLE I

COMPARATIVE GLASS COMPOSITIONS AND COMPOSITIONS OF THE INVENTION (amounts of the oxides are in % by weight)

| | V1 | V2 | V3 | V4 | A1 | A2 | A3 | A4 | A5 | A6 | A7 |
|---|---|---|---|---|---|---|---|---|---|---|---|
| $SiO_2$ | 74.80 | 74.40 | 73.90 | 73.40 | 75.10 | 74.90 | 75.05 | 74.95 | 75.15 | 75.08 | 75.10 |
| $Al_2O_3$ | 1.40 | 1.40 | 1.40 | 1.40 | 1.40 | 1.40 | 1.40 | 1.40 | 1.40 | 1.40 | 1.40 |
| $B_2O_3$ | 16.90 | 16.80 | 16.80 | 16.80 | 16.80 | 16.80 | 16.80 | 16.80 | 16.80 | 16.80 | 16.80 |
| $Li_2O$ | | | | | | | | | | | |
| $Na_2O$ | 3.95 | 3.95 | 3.95 | 3.95 | 3.95 | 3.95 | 3.95 | 3.95 | 3.95 | 3.95 | 3.95 |
| $K_2O$ | 1.45 | 1.45 | 1.45 | 1.45 | 1.45 | 1.45 | 1.45 | 1.45 | 1.45 | 1.45 | 1.45 |
| MgO | 0.40 | 0.40 | 0.40 | 0.40 | 0.40 | 0.40 | 0.40 | 0.40 | 0.40 | 0.40 | 0.40 |
| CaO | 0.60 | 0.60 | 0.60 | 0.60 | 0.60 | 0.60 | 0.60 | 0.60 | 0.60 | 0.60 | 0.60 |
| SrO | | | | | | | | | | | |
| BaO | | | | | | | | | | | |
| ZnO | | | | | | | | | | | |
| $As_2O_3$ | | | | | | | | | | | |
| $Sb_2O_3$ | | | | | | | | | | | |
| $Fe_2O_3$ | | | | | | | | | | | |
| $TiO_2$ | 0.50 | 1.00 | 1.50 | 2.00 | | | 0.20 | 0.20 | | 0.10 | 0.10 |
| $CeO_2$ | | | | | | | | | | | |
| $SnO_2$ | | | | | | | | | | | |
| NaCl | | | | | | | | | | | |
| $MoO_3$ | | | | | 0.15 | 0.50 | 0.15 | 0.25 | 0.25 | 0.22 | 0.20 |
| $Bi_2O_3$ | | | | | 0.15 | | | | | | |
| Sum | 100.00 | 100.00 | 100.00 | 100.00 | 100.00 | 100.00 | 100.00 | 100.00 | 100.00 | 100.00 | 100.00 |

The figures show that the transmittances curves for glass with a $TiO_2$ content of 0.5 wt. % no longer fall within the required areas bounded by the equations $\tau=1.7\cdot(\lambda-277)$ and $\tau=1.6\cdot(\lambda-284)$ in a wavelength range of from 283 nm to 325 nm on the graphs of spectral transmittance vs. wavelength in the case of both irradiated and not irradiated samples. The glass with this $TiO_2$ content has a comparatively steep transmittance gradient (FIG. 1), while that of the invention (FIG. 2) has a more gradual change in transmittance with wavelength.

In the case of the glass of the invention shown in FIG. 2 the transmittance curves fall within the required corridor for the irradiated (solarized) glass samples as well as samples of the glass which have not been irradiated. This shows that the glass of the invention has a UV-cutoff with a gentler gradient than the glass of the prior art, even after it is solarized for 15 hours.

2. Preferred Radiating Device

Figure 3:
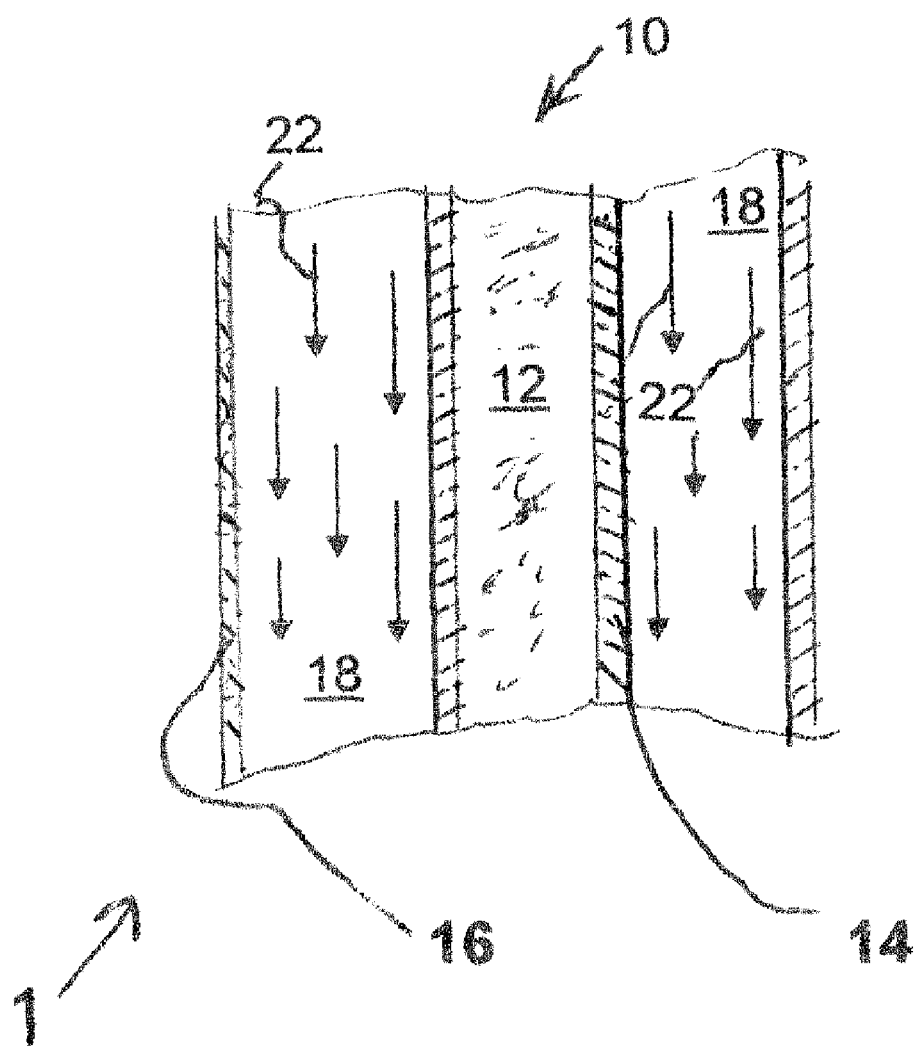
FIG. 3 is a diagrammatic cutaway cross-sectional view through a part of radiating device for a weathering apparatus according to the present invention.

FIG. 3 shows a preferred embodiment of a radiating device 1 that comprises a light source 12 of a lamp 10. The light source 12 is arranged within an inner glass tube 14, which is surrounded by an outer glass tube 16 so that a hollow space 18 is formed between the inner glass tube 14 and the outer glass tube 16. A cooling medium 22, preferably water, flows through the hollow space 18.

The inner and/or the outer glass tubes 14, 16 are made with the aforesaid glass compositions according to the invention so that their transmittance curves are within an area bounded by or within a corridor defined by the respective equations $\tau=1.7\cdot(\lambda-277)$ and $\tau=1.6\cdot(\lambda-284)$ in a wavelength range of from 283 nm to 325 nm.

While the invention has been illustrated and described as embodied in a solarization-resistant glass composition having a UV-cutoff with a defined gradient and a radiating device for a weathering apparatus containing a glass of that composition, it is not intended to be limited to the details shown, since various modifications and changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed is new and is set forth in the following appended claims.

We claim:

1. A solarization-resistant glass having a UV-cutoff with a definite or predetermined transmittance gradient, said solarization-resistant glass having a composition, in percent by weight on the basis of oxide content, comprising:

| | |
|---|---|
| $SiO_2$ | 55-82 |
| $B_2O_3$ | 10-20 |
| $Al_2O_3$ | 1-10 |
| $Li_2O$ | 0-5 |
| $Na_2O$ | 0-10 |
| $K_2O$ | 0-10 |
| Σ alkali oxides | 0-10 |
| MgO | 0-5 |
| CaO | 0-10 |
| SrO | 0-5 |
| BaO | 0-15 |
| Σ alkaline earth oxides | 0-15 |
| $ZrO_2$ | 0-3 |
| ZnO | 0-5 |
| $CeO_2$ | 0-2 |
| $WO_3$ | 0-3 |
| $SnO_2$ | 0-2 |
| $Fe_2O_3$ as impurity | 0-0.1 |
| $MoO_3$ | 0.15-0.25 |
| $Bi_2O_3$ | 0-5 |
| $TiO_2$ | 0-1 |
| Oxides of Rh, Hf, Ta, Re, Os, Ir, Pt, La, Pr, Nd, Sm, Eu, Gd, Tb, Dy, Ho, Er, Tm, Yb, Lu | 0-5; | and with a transmittance curve within a corridor or area bounded by respective curves defined by corresponding equations $\tau=1.7\cdot(\lambda-277)$ and $\tau=1.6\cdot(\lambda-284)$ in a wavelength range of from 283 nm to 325 nm, wherein $\tau$ is transmittance in percent and $\lambda$ is wavelength in nm.

2. The solarization-resistant glass as defined in claim 1, wherein said composition comprises, in weight percent on the basis of oxide content:

| | |
|---|---|
| $SiO_2$ | 60-79 |
| $B_2O_3$ | 15-20 |
| $Al_2O_3$ | 1-4 |
| $Li_2O$ | 0-2 |
| $Na_2O$ | 0-5 |
| $K_2O$ | 0-7 |
| Σ alkali oxides | 0-10 |
| MgO | 0-2 |
| CaO | 0-2 |
| SrO | 0-1 |
| BaO | 0-4 |
| Σ alkaline earth oxides | 0-5 |
| $ZrO_2$ | 0-3 |
| $CeO_2$ | 0-1 |
| $Fe_2O_3$ | 0-0.05 |
| $WO_3$ | 0-1 |
| $SnO_2$ | 0-2 |
| $MoO_3$ | 0.15-0.25 |
| $Bi_2O_3$ | 0-1 |
| $TiO_2$ | 0-0.5. |

3. The solarization-resistant glass as defined in claim 1, wherein said composition comprises from 0.1 to 0.2 wt. % of said $TiO_2$ and/or from 0.1 to 0.2 wt. % of said $Bi_2O_3$.

4. A radiating device for a weathering apparatus, said radiating device comprising:
an outer glass tube;
an inner glass tube arranged within the outer glass tube so as to form an intervening chamber between the inner glass tube and the outer glass tube through which a cooling fluid flows; and
a lamp with a light source arranged inside of the inner glass tube;
wherein the inner glass tube and/or the outer glass tube comprises a solarization-resistant glass having a composition, in percent by weight on the basis of oxide content, comprising:

| | |
|---|---|
| $SiO_2$ | 55-82 |
| $B_2O_3$ | 10-20 |
| $Al_2O_3$ | 1-10 |
| $Li_2O$ | 0-5 |
| $Na_2O$ | 0-10 |
| $K_2O$ | 0-10 |
| Σ alkali oxides | 0-10 |

| | |
|---|---|
| MgO | 0-5 |
| CaO | 0-10 |
| SrO | 0-5 |
| BaO | 0-15 |
| Σ alkaline earth oxides | 0-15 |
| $ZrO_2$ | 0-3 |
| ZnO | 0-5 |
| $CeO_2$ | 0-2 |
| $WO_3$ | 0-3 |
| $SnO_2$ | 0-2 |
| $Fe_2O_3$ as impurity | 0-0.1 |
| $MoO_3$ | 0.15-0.25 |
| $Bi_2O_3$ | 0-5 |
| $TiO_2$ | 0-1 |
| Oxides of Rh, Hf, Ta, Re, Os, Ir, Pt, La, Pr, Nd, Sm, Eu, Gd, Tb, Dy, Ho, Er, Tm, Yb, Lu | 0-5; | and with a transmittance curve within an area bounded by or a corridor formed by respective curves defined by corresponding equations $\tau=1.7\cdot(\lambda-277)$ and $\tau=1.6\cdot(\lambda-284)$ in a wavelength range of from 283 nm to 325 nm, wherein $\tau$ is transmittance in percent and $\lambda$ is wavelength in nm.

5. The radiating device as defined in claim 4, wherein said composition comprises, in weight percent on the basis of oxide content:

| | |
|---|---|
| $SiO_2$ | 60-79 |
| $B_2O_3$ | 15-20 |
| $Al_2O_3$ | 1-4 |
| $Li_2O$ | 0-2 |
| $Na_2O$ | 0-5 |
| $K_2O$ | 0-7 |
| Σ alkali oxides | 0-10 |
| MgO | 0-2 |
| CaO | 0-2 |
| SrO | 0-1 |
| BaO | 0-4 |
| Σ alkaline earth oxides | 0-5 |
| $ZrO_2$ | 0-3 |
| $CeO_2$ | 0-1 |
| $Fe_2O_3$ | 0-0.05 |
| $WO_3$ | 0-1 |
| $SnO_2$ | 0-2 |
| $MoO_3$ | 0.15-0.25 |
| $Bi_2O_3$ | 0-1 |
| $TiO_2$ | 0-0.5. |

6. The radiating device as defined in claim 4, wherein both said inner glass tube and said outer glass tube have said composition.

7. The radiating device as defined in claim 4, wherein said composition comprises from 0.1 to 0.2 wt. % of said $TiO_2$ and/or from 0.1 to 0.2 wt. % of said $Bi_2O_3$.

8. The radiating device as defined in claim 4, wherein said cooling fluid is water.

* * * * *